US006980128B2

(12) United States Patent
Godard et al.

(10) Patent No.: US 6,980,128 B2
(45) Date of Patent: *Dec. 27, 2005

(54) DISPLAY SYSTEM FOR AN AIRCRAFT

(75) Inventors: Eric Godard, Toulouse (FR); David Chabe, Toulouse (FR); Jacques Espinasse, Pibrac (FR)

(73) Assignee: Airbus France S.A.S., Toulouse (FR)

( * ) Notice: Subject to any disclaimer, the term of this patent is extended or adjusted under 35 U.S.C. 154(b) by 0 days.

This patent is subject to a terminal disclaimer.

(21) Appl. No.: 10/715,393

(22) Filed: Nov. 19, 2003

(65) Prior Publication Data

US 2004/0155799 A1 Aug. 12, 2004

Related U.S. Application Data

(62) Division of application No. 10/261,484, filed on Oct. 2, 2002.

(30) Foreign Application Priority Data

Nov. 8, 2001 (FR) .................................. 01 14451

(51) Int. Cl.[7] ............................................. G08B 21/00
(52) U.S. Cl. .................... 340/945; 340/966; 340/967; 340/969; 340/973; 340/975; 340/978
(58) Field of Search ................... 340/945, 966, 340/967, 969, 973, 975, 978

(56) References Cited

U.S. PATENT DOCUMENTS

| 4,457,479 | A | * | 7/1984 | Daude .......................... 244/203 |
|---|---|---|---|---|
| 4,590,475 | A | * | 5/1986 | Brown .......................... 340/966 |
| 4,764,872 | A | * | 8/1988 | Miller ............................. 701/3 |
| 4,910,513 | A | * | 3/1990 | Kelly et al. .................. 340/966 |
| 4,924,401 | A | * | 5/1990 | Bice et al. ....................... 701/6 |
| 5,003,305 | A | * | 3/1991 | Kelly et al. .................. 340/974 |
| 5,127,608 | A | * | 7/1992 | Farineau et al. .......... 244/76 R |
| 5,248,968 | A | * | 9/1993 | Kelly et al. .................. 340/961 |
| 5,289,185 | A | * | 2/1994 | Ramier et al. ............... 340/971 |
| 5,595,357 | A | * | 1/1997 | Catlin et al. ................. 244/1 R |
| 5,675,327 | A | * | 10/1997 | Coirier et al. .............. 340/973 |
| 5,675,328 | A | * | 10/1997 | Coirier et al. .............. 340/975 |
| 5,808,563 | A | * | 9/1998 | Ching et al. ................. 340/976 |
| 5,912,627 | A | * | 6/1999 | Alexander ................ 340/815.4 |
| 5,978,715 | A | * | 11/1999 | Briffe et al. ................... 701/11 |
| 6,062,513 | A | * | 5/2000 | Lambregts ................... 244/175 |
| 6,169,496 | B1 | * | 1/2001 | Martin et al. ................ 340/966 |
| 6,246,929 | B1 | * | 6/2001 | Kaloust ......................... 701/11 |
| 6,271,769 | B1 | * | 8/2001 | Frantz .......................... 340/963 |

* cited by examiner

Primary Examiner—Benjamin C. Lee
(74) Attorney, Agent, or Firm—Oblon, Spivak, McClelland, Maier & Neustadt, P.C.

(57) ABSTRACT

A display system for an aircraft includes a central unit configured to determine a speed vector of the aircraft and to determine a longitudinal margin of maneuver of the aircraft. The longitudinal margin of maneuver is expressed as a load factor and is related to one of a pitch-up maneuver and a pitch-down maneuver. The display system also includes a display unit connected to the central unit. The display unit includes a display screen configured to display a first characteristic sign illustrating the speed vector and a second characteristic sign illustrating the longitudinal margin of maneuver.

20 Claims, 2 Drawing Sheets

DISPLAY SYSTEM FOR AN AIRCRAFT

CROSS-REFERENCE TO RELATED APPLICATIONS

This application is a divisional application of published U.S. patent application Ser. No. 10/261,484, filed Oct. 2, 2002, which claims priority under 35 U.S.C. § 119 to French Patent Application 01 14451, filed on Nov. 8, 2001, the entire disclosures of which are both incorporated herein by reference.

BACKGROUND OF THE INVENTION

1. Field of the Invention

The present invention relates to an aircraft display system for aiding the piloting of an aircraft.

2. Discussion of the Background

It is known that, to aid a pilot of an aircraft, for example of a transport plane, to manage the piloting, it is customary for the values of parameters which are representative of the flight, such as the speed of the aircraft, to be presented on a particular indicator or a piloting screen (such as a PFD ("Primary Flight Display") screen for example).

On a PFD piloting screen there is depicted, in general, in this case, in addition to the speed, a minimum allowable limit value for this speed. This minimum value or speed (which can vary as a function of diverse parameters) corresponds to the maximum allowable angle of incidence, beyond which the aircraft is subject to a stalling phenomenon. When he wishes to engage a maneuver, a pilot can visually check the margin available between the current speed of the aircraft and the limit value. If this margin tends to become zero, he knows that his action on a control stick is at risk of not being able to be carried out correctly by the aircraft (risk of stalling or activation of the protection facilities of the flight control laws).

On certain aircraft, the pilot is furnished with a "head up" viewfinder HUD ("Head Up Display"), on which is displayed the direction of the speed vector of the aircraft. The document U.S. Pat. No. 5,808,563 describes for example such a viewfinder. The use of this viewfinder is especially suited to the take-off and landing phases. However, it exhibits drawbacks during the other phases of flight. For example, when piloting a military aircraft by sight, at low altitude, the speed vector, superimposed on the view of the outside world through the windshield, indicates the point toward which the aircraft is directed, without however being representative of the magnitude of the speed. The pilot is therefore furnished with instrument-based piloting information in the HUD viewfinder so as to maneuver the aircraft correctly under conditions demanding sustained attention to the outside environment (for example: presence of nearby reliefs), without having to avert his gaze from this environment visible through the windshield. He is thus furnished with information depicted on the HUD viewfinder.

However, the pilot is not furnished with the information depicted on the PFD piloting screen. Specifically, for reasons on the one hand of clarity and of readability of the information and, on the other hand, of visibility through the windshield, it is not desirable to present all the information on the HUD viewfinder. In particular, the current speed of the aircraft and the limit value of the speed cannot be depicted clearly as on a PFD piloting screen. Yet, when the margin between these two items of speed information is disregarded, if the pilot attempts for example to pitch the nose of the aircraft up (by pulling on the control stick) in order to clear a relief although this margin is already substantially zero, the aircraft will not be able to respond to this action and will not modify its trajectory as desired, thus running the risk of striking the relief.

SUMMARY OF THE INVENTION

The object of the present invention is to remedy these drawbacks. It relates to a process for aiding the piloting of an aircraft, making it possible for a pilot of the aircraft to be presented with information which is important for the management of piloting.

For this purpose, the process, according to which a first characteristic sign illustrating a speed vector of the aircraft is presented on a display screen, is noteworthy, according to the invention, in that moreover at least one longitudinal margin of maneuver of the aircraft is determined, which is expressed as a load factor and which relates to one of the two maneuvers of pitch-up and of pitch-down of the aircraft. Also, at least one second characteristic sign which is associated with the first characteristic sign and which illustrates the longitudinal margin of maneuver is presented on the display screen.

Thus, by virtue of the invention, the pilot is presented with a longitudinal margin of maneuver which may be defined as the difference between an allowable limit value and the current value of a quantity characteristic of the longitudinal motion of the aircraft. This longitudinal margin of maneuver therefore represents the domain of maneuver accessible to the pilot in order to comply with the operational limitations of the aircraft. The invention is therefore especially well suited to an HUD viewfinder.

It will moreover be noted that, contrary to the information usually displayed on a PFD piloting screen including as stated above a speed margin, the longitudinal margin of maneuver in accordance with the present invention is expressed in terms of load factor.

This gives rise to several important advantages. A first advantage is related to the fact that the load factor is more representative of the dynamic behavior of the aircraft than is a value such as the speed. Thus, under certain flight conditions, a margin expressed in terms of load factor is more representative of the margin of maneuver of the aircraft than a margin expressed in terms of speed.

Furthermore, under the assumption that the calculations leading to the establishment of the margin of maneuver call upon approximations consisting in linearizing flight mechanics equations over a domain close to the instantaneous conditions of flight of the aircraft, the errors due to the approximations are lower when the margin of maneuver is calculated in terms of load factor than when it is calculated in terms of speed.

Another advantage appearing when using an HUD viewfinder results from the fact that the depiction on the HUD viewfinder is carried out in a plane which is perpendicular to the longitudinal axis of the aircraft. Thus, it is more ergonomic to provide a margin of maneuver expressed as a load factor Nz, hence along the vertical axis which is included in the plane of the HUD viewfinder, rather than a speed margin, which corresponds to information along the longitudinal axis which is perpendicular to the plane of the HUD viewfinder.

Additionally, in the case where the aircraft's flight controls are such that the commands entered by the pilot by means of the control stick are expressed, along the vertical axis, as a load factor Nz, the longitudinal margin of maneuver also has the advantage of being homogeneous with the actions of the pilot on the control stick.

Advantageously, two longitudinal margins of maneuver are determined which relate respectively to the pitch-up maneuver and to the pitch-down maneuver of the aircraft and two second corresponding characteristic signs are presented on the display screen.

Furthermore, advantageously, the second characteristic sign is presented on the display screen in such a way that the distance between the first and second characteristic signs is proportional to the longitudinal margin of maneuver.

In a preferred embodiment, the second characteristic sign is presented on the display screen only if the longitudinal margin of maneuver is less than a predetermined value. This makes it possible not to overload the display screen when the margin of maneuver is sufficient to be able to maneuver the aircraft with no risk of limitation.

In a particular embodiment, the most constraining margin of maneuver between a first load factor margin and a second margin is determined as longitudinal margin of maneuver.

In this case, firstly, to determine the margin of maneuver relating to the pitch-up maneuver, the second margin advantageously corresponds to an angle of incidence margin $\Delta\alpha$.

Preferably, the angle of incidence margin $\Delta\alpha$ is calculated from the following expression:

$$\Delta\alpha = 1 - \left[\left(\frac{Nz}{\Delta N \max}\right) \cdot \left(\frac{\alpha \max - \alpha}{\alpha - \alpha 0}\right)\right]$$

in which:
Nz is the load factor;
$\Delta$Nmax is the maximum value of margin of maneuver depicted;
$\alpha$ is the angle of incidence;
$\alpha$max is the maximum angle of incidence; and
$\alpha$0 is the zero lift angle of incidence.

Furthermore, secondly, to determine the margin of maneuver relating to the pitch-down maneuver, the second margin advantageously corresponds to a speed margin $\Delta V$.

Preferably, the speed margin $\Delta V$ is calculated from the following expression:

$$\Delta V = 1 - \left[\frac{Nz + Kp(V \max - V) - Kd(dV/dt)}{\Delta N \max}\right]$$

in which:
Nz is the load factor;
$\Delta$Nmax is the maximum value of margin of maneuver depicted;
V is the speed of the aircraft;
Vmax is the maximum speed of the aircraft;
(dV/dt) is the derivative with respect to time of the speed V; and
Kp and Kd are predetermined parameters.

The present invention also relates to a device for aiding the piloting of an aircraft, which is able to implement the described process.

According to the invention, the device of the type includes means of determination for determining a speed vector of the aircraft and means of depiction for presenting on a display screen a first characteristic sign illustrating the speed vector of the aircraft. The device also includes auxiliary means of determination for determining at least one longitudinal margin of maneuver of the aircraft, which is expressed as a load factor and which relates to one of the two maneuvers of pitch-up and of pitch-down of the aircraft, and in that the means of depiction moreover present, on the display screen, at least one second characteristic sign which is associated with the first characteristic sign and which illustrates the longitudinal margin of maneuver.

Preferably, the auxiliary means of determination include first means for determining a longitudinal margin of maneuver which relates to a pitch-up maneuver of the aircraft and second means for determining a longitudinal margin of maneuver which relates to a pitch-down maneuver of the aircraft.

The present invention moreover relates to an aircraft, in particular a transport plane, which is equipped with a device for aiding piloting such as that stated above.

BRIEF DESCRIPTION OF THE DRAWING(S)

The figures of the appended drawing will clearly elucidate the manner in which the invention may be embodied. In these figures, identical references denote similar elements.

DESCRIPTION OF THE PREFERRED EMBODIMENTS

Figure 1:
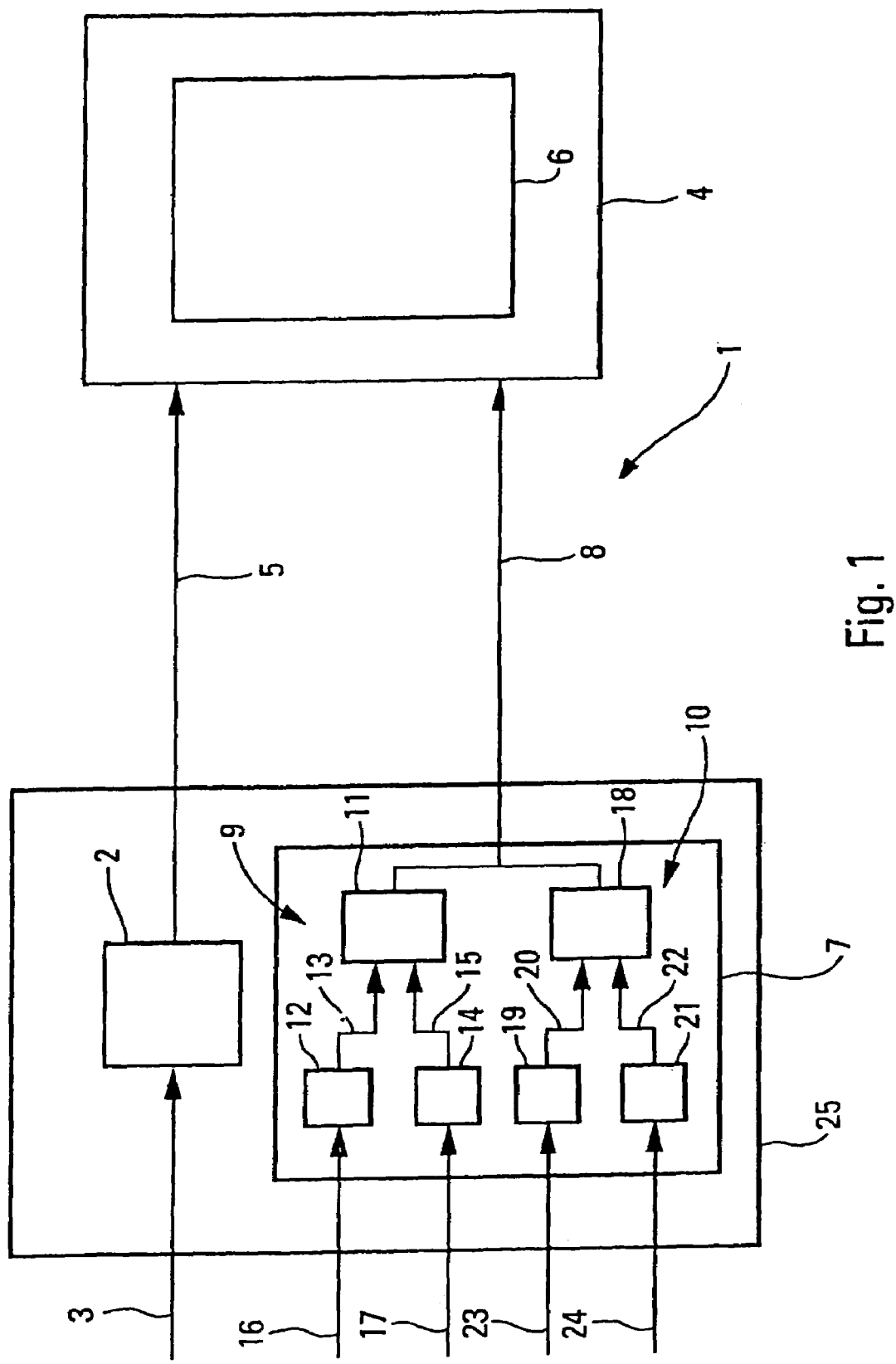
FIG. 1 is the schematic diagram of a device for aiding piloting in accordance with the invention.

The device 1 in accordance with the invention and represented diagrammatically in FIG. 1 is carried on board an aircraft, for example a transport plane, not represented, and is intended to aid a pilot of the aircraft to manage the piloting.

The device 1 includes in a known manner means 2, of standard type, which receive information via a link 3 and which determine in a standard manner the value of a speed vector of the aircraft. The device 1 also includes means of depiction 4 which are connected by a link 5 to the means 2 so as to present, in a standard manner, on a display screen 6, a first characteristic sign S1 (represented in FIGS. 2 and 3) which illustrates the speed vector of the aircraft.

According to the invention, the device 1 moreover includes auxiliary means 7 for determining at least one longitudinal margin of maneuver of the aircraft, which is expressed as a load factor Nz and which relates to one of the two maneuvers of pitch-up and of pitch-down of the aircraft. Within the framework of the present invention, the longitudinal margin of maneuver can be defined as the difference between an allowable limit value and the current value of a quantity characteristic of the longitudinal motion of the aircraft. This longitudinal margin of maneuver therefore represents the domain of maneuver accessible to the pilot in order to comply with the operational limitations of the aircraft. In a preferred embodiment of the invention, the means 2 and the auxiliary means 7 are grouped together as a single central unit 25.

The means of depiction 4 moreover present, on the display screen 6, at least one second characteristic sign S2, S3 (FIGS. 2 and 3) which is associated with the first characteristic sign S1 and which illustrates the longitudinal margin of maneuver.

The longitudinal margin of maneuver which is, according to the invention, expressed in terms of load factor Nz exhibits numerous advantages, and, in particular, better representation of the dynamic behavior of the aircraft, homogeneity with certain actions of a pilot on a control member of the aircraft, and simplification of depiction, since the longitudinal margin of maneuver is defined in the plane of the screen 6.

Figure 2:
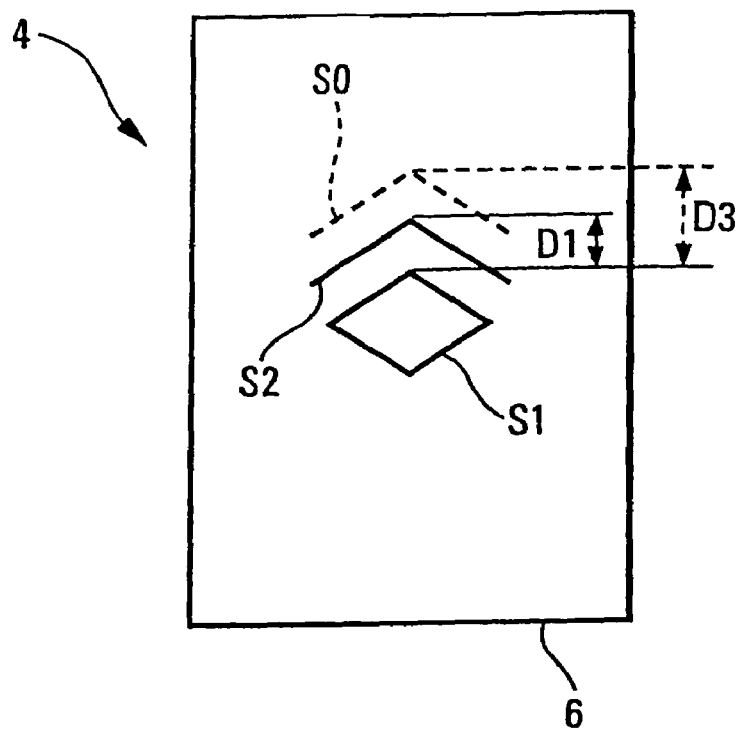
FIGS. 2 and 3 show the presentation on a display screen of characteristic signs which illustrate longitudinal margins of maneuver relating, respectively, to pitch-up and pitch-down maneuvers.
Figure 3:
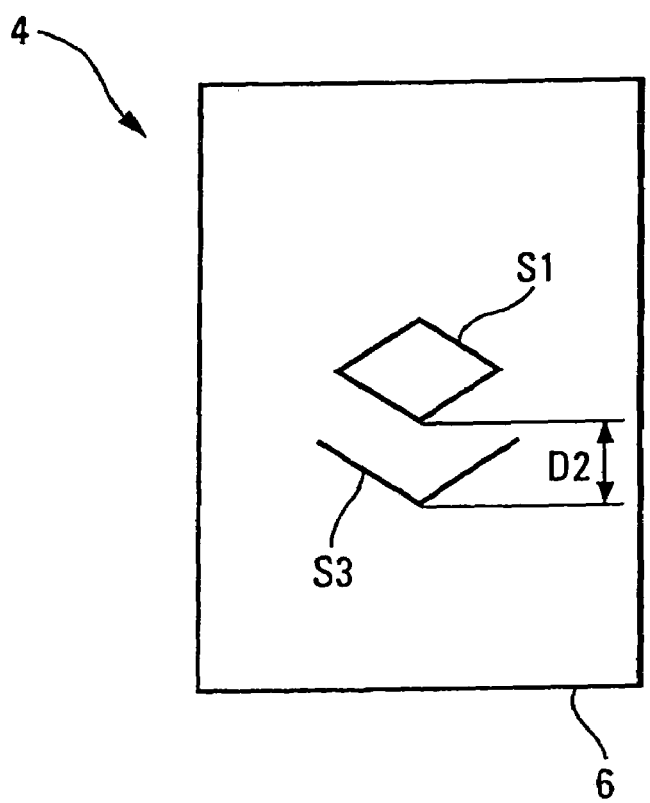

According to the invention, the auxiliary means 7 include first means 9 for determining a longitudinal margin of maneuver which relates to a pitch-up maneuver of the aircraft and which is presented by a second characteristic sign S2 (FIG. 2), and second means 10 for determining a longitudinal margin of maneuver which relates to a pitch-down maneuver of the aircraft and which is presented by a second characteristic sign S3 (FIG. 3).

In a preferred embodiment shown in FIGS. 2 and 3, the first characteristic sign S1, illustrating the speed vector, is represented in the form of a diamond, and the second characteristic sign S2, S3, illustrating the longitudinal margin of maneuver, is represented in the form of a chevron, which is arranged above (pitch-up) or below (pitch-down) the first characteristic sign S1.

Moreover, according to the invention, each second characteristic sign S2, S3 is presented on the display screen 6 in such a way that the distance D1, D2 between the first characteristic sign S1 and this second characteristic sign S2, S3 is proportional to the corresponding longitudinal margin of maneuver, determined by the auxiliary means 7.

Thus, according to the invention, the distance D1 (FIG. 2) between the signs S1 and S2 is proportional to the longitudinal margin of maneuver relating to a pitch-up maneuver, and the distance D2 (FIG. 3) between the signs S1 and S3 is proportional to the longitudinal margin of maneuver relating to a pitch-down maneuver.

Additionally, as shown in FIG. 2, the second characteristic sign S2 is presented on the display screen 6 only if the longitudinal margin of maneuver is less than a predetermined value $\Delta Nmax$ (illustrated by a dashed chevron S0), that is to say only if the distance D1 is less than a predetermined distance D3.

The means 9 for determining the longitudinal margin of maneuver relating to a pitch-up maneuver include means 11 for determining, as longitudinal margin of maneuver, the most constraining margin of maneuver between a first load factor margin $\Delta Nzc$ determined by a means of calculation 12 and received via a link 13, and a second angle of incidence margin $\Delta\alpha$ determined by a means of calculation 14 and received via a link 15.

Of course, as indicated previously, according to the invention these margins $\Delta Nzc$ and $\Delta\alpha$ are both expressed in terms of load factor Nz.

The means 11 which at each instant take into account the most constraining margin therefore choose the smaller of the two margins.

Moreover, as indicated previously, the margin available at the output of the means 11 is not depicted by the means 4 unless it is less than the value $\Delta Nmax$ (chevron S0). This makes it possible not to overload the depiction when the margin is sufficient to be able to maneuver the aircraft with no risk of limitation related to the load factor Nz or to the angle of incidence $\alpha$.

The load factor margin $\Delta Nzc$ which is calculated by the means of calculation 12, on the basis of information received via a link 16, is equal to the difference between the maximum permitted load factor Nzmax and the current load factor Nz. In order to be depicted correctly on the screen 6, this difference is of course scaled.

Preferably, the following formula is used to calculate the value depicted $\Delta Nzc$:

$$\Delta Nzc = 1 - \left[\frac{Nz\max - Nz}{\Delta N \max}\right] (\text{for } Nz < Nz \max)$$

By convention, the value depicted $\Delta Nzc$ is equal to 0 when the margin is equal to the maximum value depicted $\Delta Nmax$ (the characteristic sign S2 representing the margin is far away from the maximum of the speed vector S1 on the screen 6 and lies on S3), and it is equal to 1 when the margin is zero (the characteristic sign S2 representing the margin then lies on the speed vector S1 on the screen 6).

As regards the angle of incidence margin $\Delta\alpha$, which is calculated by the means of calculation 14 on the basis of information received via a link 17, it is equal to the difference between the maximum permitted angle of incidence $\Delta\max$ and the current angle of incidence $\alpha$.

As was indicated previously, in order to be depicted correctly on the screen 6, this distance is first converted into a load factor Nz, then scaled.

By firstly writing the equation of lift of the aircraft for the angles of incidence $\alpha$ and $\alpha\max$, we obtain:

$$\begin{cases} NzM \cdot g = 1/2 \cdot \rho \cdot s \cdot V^2, Cz\alpha \cdot (\alpha - \alpha 0) \\ Nz(\alpha\max)M \cdot g = 1/2 \cdot \rho \cdot s \cdot V^2, Cz\alpha \cdot (\alpha\max - \alpha 0) \end{cases}$$

where:
M is the mass of the aircraft;
g is the acceleration due to gravity;
$\rho$ is the density of the air;
s is a reference area (flying surface);
V is the speed of the aircraft with respect to the air;
$Cz\alpha$ is the lift gradient; and
$\alpha 0$ is the zero lift angle of incidence, from which we deduce:

$$Nz(\alpha\max) = Nz\left(\frac{\alpha\max - \alpha 0}{\alpha - \alpha 0}\right).$$

In a manner similar to $\Delta Nzc$, we define $\Delta\alpha$ by the following equation which takes account of its scaling:

$$\Delta\alpha = 1 - \left(\frac{Nz(\alpha\max) - Nz}{\Delta N \max}\right)(\text{for } Nz < Nz(\alpha\max))$$

by replacing $Nz(\alpha\max)$ by the value arising from the equation above, we obtain:

$$\Delta\alpha = 1 - \left[\left(\frac{Nz}{\Delta N \max}\right) \cdot \left(\frac{\alpha\max - \alpha}{\alpha - \alpha 0}\right)\right].$$

As previously for $\Delta Nzc$, the value depicted $\Delta\alpha$ is equal to 0 when the margin is equal to the maximum value $\Delta Nmax$ (the characteristic sign S2 representing the margin is far away from the maximum of the speed vector S1 on the screen 6 and lies on S3), and it is equal to 1 when the margin is zero (the characteristic sign S2 representing the margin then touches the speed vector S1 on the screen 6).

In a preferred but nonexclusive manner, the value of $\Delta$max (which depends in particular on the value of the Mach number and on the configuration of the aircraft (position of the flaps, etc)) is output by a computer (not represented) carried on board the aircraft, this computer using or otherwise providing the value for other applications (piloting laws, flight controls, etc).

In a preferred embodiment of the invention relating to a civil or military transport plane, we take a value $\Delta$Nmax equal to 0.5 g, the value Nzmax being for its part substantially equal to 2.5 g or 2 g as a function of the configuration of the aircraft.

Additionally, the means 10 for determining the longitudinal margin of maneuver relating to a pitch-down maneuver include means 18 for determining, as longitudinal margin of maneuver, the most constraining margin of maneuver between a first load factor margin $\Delta$Nzp determined by a means of calculation 19 and received via a link 20, and a second speed margin $\Delta$V determined by a means of calculation 21 and received via a link 22.

Of course, as indicated previously, according to the invention these margins $\Delta$Nzp and $\Delta$V are both expressed in terms of load factor Nz.

The means 18 which at each instant take into account the most constraining margin therefore choose the smaller of the above two margins.

Furthermore, as indicated previously, the margin available at the output of the means 18 is not depicted by the means 4 unless it is less than the value $\Delta$Nmax. This makes it possible not to overload the depiction when the margin is sufficient to be able to maneuver the aircraft with no risk of limitation.

The load factor margin $\Delta$Nzp (for pitch-down) which is calculated by the means of calculation 19, on the basis of information received via a link 23, is determined in a manner similar to the margin $\Delta$Nzc (for pitch-up) stated above, using the expression:

$$\Delta Nzp = 1 - \left(\frac{Nz - Nz\min}{\Delta N \max}\right) (\text{for } Nz\min < Nz).$$

Additionally, the speed margin $\Delta$V which is calculated by the means of calculation 21, on the basis of information received via a link 24, is equal to the difference between the maximum permitted speed Vmax and the current speed V of the aircraft. In the same way as for the angle of incidence margin $\Delta\alpha$, in order to be depicted correctly on the screen 6, this difference is first converted into a load factor Nz, then scaled. The conversion is obtained by using an equation which calculates a minimum load factor (which can be denoted NzminV so as to distinguish it from Nzmin), as a function on the one hand of the discrepancy between the current speed V and a speed to be attained (Vtarget) and, on the other hand, of an anticipator term dependent on the derivative of the speed. This equation is the following:

$$NzminV = Kp(V - V\text{target}) + Kd(dV/dt).$$

In the present case, the speed to be attained (Vtarget) may be regarded as Vmax and, consequently, the equation making it possible to perform the conversion in terms of load factor becomes:

$$NzminV = -Kp(V\max - V) + Kd(dV/dt).$$

In a manner similar to $\Delta$Nzp, we define $\Delta$V by the following equation which takes of its scaling $$\Delta V = 1 - \left(\frac{Nz - Nz\min V}{\Delta N \max}\right).$$

By incorporating into this equation the value of NzminV arising from the previous equation, we obtain the formula giving the value $\Delta$V:

$$\Delta V = 1 - \left[\frac{Nz + K\rho(V\max - V) - Kd(dV/dt)}{\Delta N \max}\right].$$

What is claimed is:

1. A display system for an aircraft, comprising:
a central unit configured to determine a speed vector of the aircraft and to determine a longitudinal margin of maneuver of the aircraft, wherein the longitudinal margin of maneuver is expressed as a load factor and is related to one of a pitch-up maneuver and a pitch-down maneuver; and
a display unit connected to the central unit and including a display screen configured to display a first characteristic sign illustrating the speed vector and a second characteristic sign illustrating the longitudinal margin of maneuver, wherein a distance between the first characteristic sign and the second characteristic sign is proportional to the longitudinal margin of maneuver.

2. The display system of claim 1, wherein the display screen is a heads-up display screen.

3. The display system of claim 1, wherein the first characteristic sign is shaped as a diamond and the second characteristic sign is shaped as a chevron.

4. The display system of claim 1, wherein the central unit includes:
a first determining unit configured to determine a longitudinal margin of maneuver related to a pitch-up maneuver; and
a second determining unit configured to determine a longitudinal margin of maneuver related to a pitch-down maneuver.

5. The display system of claim 4, wherein the first determining unit determines the longitudinal margin by selecting the smaller of a first load factor margin and an angle of incidence margin.

6. The display system of claim 5, wherein the angle of incidence margin is calculated from the following expression:

$$\Delta\alpha = 1 - [(Nz/\Delta N\max)*((\alpha\max - \alpha)/(\alpha - \alpha 0))],$$

wherein $\Delta\alpha$ is the angle of incidence margin, Nz is a load factor, $\Delta$Nmax is a maximum value of margin of maneuver depicted, $\alpha$ is a angle of incidence, a max is a maximum angle of incidence, and $\alpha 0$ is a zero lift angle of incidence.

7. The display system of claim 4, wherein the second determining unit determines the longitudinal margin by selecting the smaller of a first load factor margin and a speed margin.

8. The display system of claim 7, wherein the speed margin is calculated from the following expression:

$$\Delta V = 1 - [(Nz + Kp(V\max - V) - Kd(dV/dt))/\Delta N\max],$$

wherein $\Delta$V is the speed margin, Nz is a load factor, $\Delta$Nmax is a maximum value of margin of maneuver depicted, V is a speed of the aircraft, Vmax is a maximum speed of the aircraft, (dV/dt) is a derivative with respect to time of the speed V, and Kp and Kd are predetermined parameters.

9. The display system of claim 1, wherein the display unit displays the second characteristic sign only when the determined longitudinal margin of maneuver is less than a predetermined value.

10. A display system for an aircraft, comprising:
a central unit including a first determining unit configured to determine a speed vector of the aircraft and a second determining unit configured to determine a longitudinal margin of maneuver of the aircraft; and
a display unit including a display screen configured to display a first characteristic sign illustrating the speed vector of the aircraft and a second characteristic sign illustrating the longitudinal margin of maneuver of the aircraft, wherein a distance between the first characteristic sign and the second characteristic sign is proportional to the longitudinal margin of maneuver.

11. The display system of claim 10, wherein the second determining unit includes a first selecting unit configured to determine a longitudinal margin of maneuver related to a pitch-up maneuver by selecting the smaller of a pitch-up load factor margin and an angle of incidence margin.

12. The display system of claim 11, wherein the second determining unit includes a second selecting unit configured to determine a longitudinal margin of maneuver related to a pitch-down maneuver by selecting the smaller of a pitch-down load factor margin and a speed margin.

13. The display system of claim 12, wherein the second determining unit includes:
a first margin calculating unit configured to determine the pitch-up load factor margin;
a second margin calculating unit configured to determine the angle of incidence margin;
a third margin calculating unit configured to determine the pitch-down load factor margin; and
a fourth margin calculating unit configured to determine the speed margin.

14. The display system of claim 13, wherein the second margin calculating unit determines the angle of incidence margin using the following expression:

$$\Delta\alpha = 1 - [(Nz/\Delta Nmax)*((\alpha max - \alpha)/(\alpha - \alpha 0))],$$

wherein $\Delta\alpha$ is the angle of incidence margin, Nz is a load factor, $\Delta Nmax$ is a maximum value of margin of maneuver depicted, $\alpha$ is a angle of incidence, $\alpha max$ is a maximum angle of incidence, and $\alpha 0$ is a zero lift angle of incidence.

15. The display system of claim 13, wherein the fourth margin calculating unit determines the speed margin using the following expression:

$$\Delta V = 1 - [(Nz + Kp(Vmax - V) - Kd(dV/dt))/\Delta Nmax],$$

wherein $\Delta V$ is the speed margin, Nz is a load factor, $\Delta Nmax$ is a maximum value of margin of maneuver depicted, V is the speed of the aircraft, Vmax is a maximum speed of the aircraft, (dV/dt) is a derivative with respect to time of the speed V, and Kp and Kd are predetermined parameters.

16. A display system for an aircraft, comprising:
a central unit configured to determine a speed vector of the aircraft and to determine a longitudinal margin of maneuver of the aircraft; and
a display unit connected to the central unit and including a display screen configured to display a first characteristic sign illustrating the speed vector and a second characteristic sign illustrating the longitudinal margin of maneuver, wherein a distance between the first characteristic sign and the second characteristic sign is proportional to the longitudinal margin of maneuver.

17. The display system of claim 16, wherein:
the longitudinal margin of maneuver is expressed as a load factor and is related to one of a pitch-up maneuver and a pitch-down maneuver;
the display screen is a heads-up display screen;
the first characteristic sign is shaped as a diamond; and
the second characteristic sign is shaped as a chevron.

18. The display system of claim 16, wherein the central unit includes:
a first determining unit configured to determine a longitudinal margin of maneuver related to a pitch-up maneuver; and
a second determining unit configured to determine a longitudinal margin of maneuver related to a pitch-down maneuver, wherein:
the first determining unit determines the longitudinal margin by selecting the smaller of a first load factor margin and an angle of incidence margin; and
the second determining unit determines the longitudinal margin by selecting the smaller of a first load factor margin and a speed margin.

19. The display system of claim 18, wherein:
the angle of incidence margin is calculated from the following expression:

$$\Delta\alpha = 1 - [(Nz/\Delta Nmax)*((\alpha max - \alpha)/(\alpha - \alpha 0))],$$

wherein $\Delta\alpha$ is the angle of incidence margin, Nz is a load factor, $\Delta Nmax$ is a maximum value of margin of maneuver depicted, $\alpha$ is a angle of incidence, $\alpha max$ is a maximum angle of incidence, and $\alpha 0$ is a zero lift angle of incidence; and
the speed margin is calculated from the following expression:

$$\Delta V = 1 - [(Nz + Kp(Vmax - V) - Kd(dV/dt))/\Delta Nmax],$$

wherein $\Delta V$ is the speed margin, Nz is a load factor, $\Delta Nmax$ is a maximum value of margin of maneuver depicted, V is a speed of the aircraft, Vmax is a maximum speed of the aircraft, (dV/dt) is a derivative with respect to time of the speed V, and Kp and Kd are predetermined parameters.

20. The display system of claim 16, wherein the display unit displays the second characteristic sign only when the determined longitudinal margin of maneuver is less than a predetermined value.

* * * * *